Dec. 8, 1953    F. F. FOLMER    2,661,599
PNEUMATICALLY OPERATED WELDER HEAD CONSTRUCTION
Filed Dec. 26, 1950
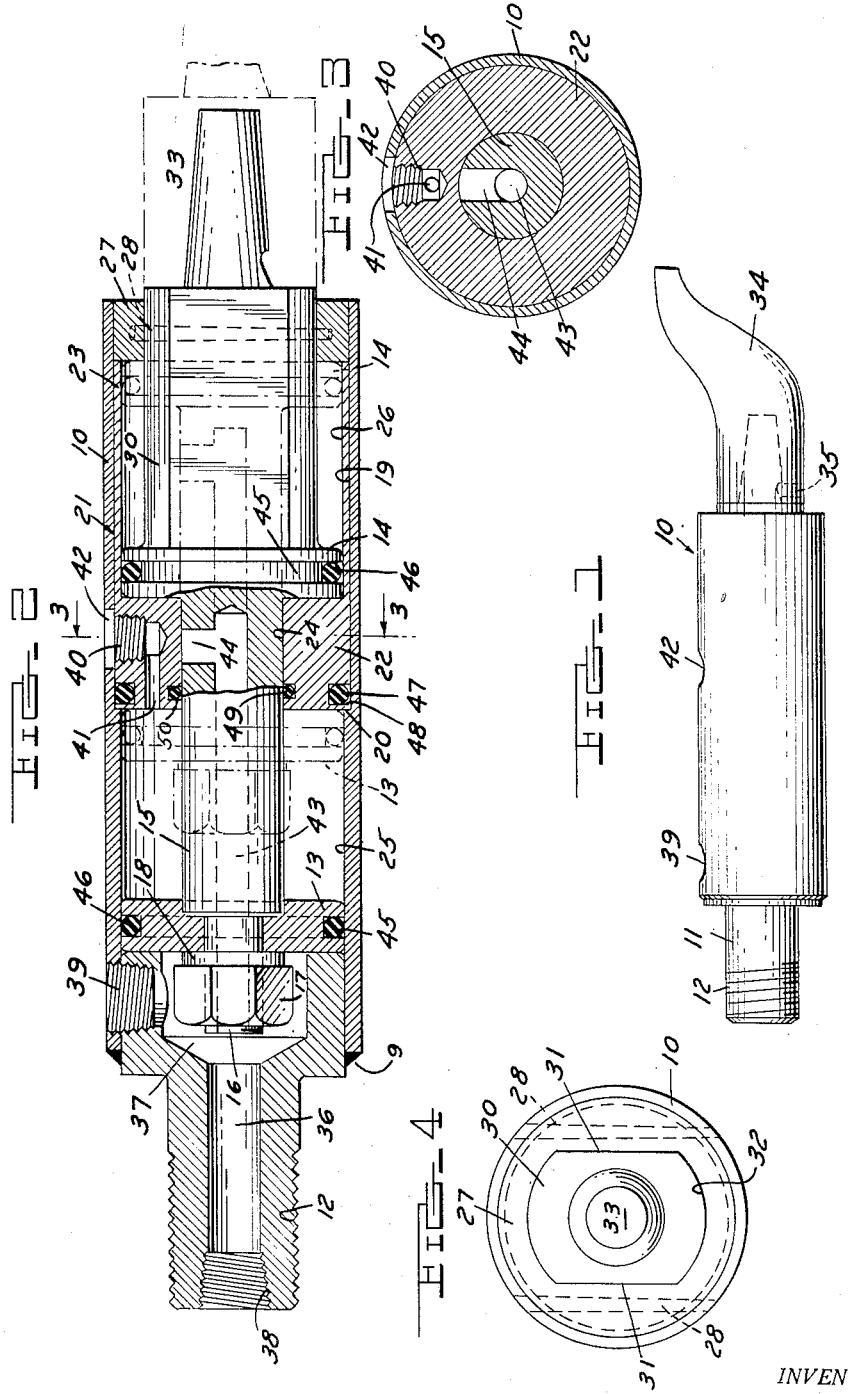
INVENTOR.
FRANK FREDRICK FOLMER
BY
Barnes, Kisselle, Laughlin & Raisch
ATTORNEYS Patented Dec. 8, 1953

2,661,599

UNITED STATES PATENT OFFICE 2,661,599

PNEUMATICALLY OPERATED WELDER HEAD CONSTRUCTION

Frank Fredrick Folmer, Detroit, Mich.

Application December 26, 1950, Serial No. 202,787

3 Claims. (Cl. 60—97)

This invention relates to a welding gun and more particularly to a pneumatically operated head for a welding gun which supports and actuates the welding electrode.

It is an object of this invention to produce a head for a welding gun which is of simple construction, which operates very efficiently, and in which the operative parts are effectively protected from weld spatter.

In the drawing:

Fig. 1 is a view showing a welder head assembly of this invention with the electrode secured thereto.

Fig. 2 is a longitudinal sectional view of the welder head.

Fig. 3 is a sectional view taken substantially along the lines 3—3 in Fig. 2.

Fig. 4 is a view of the welder head shown in Fig. 2 looking from the electrode end.

Referring to the drawing, the head comprises a body 10 in the form of a cylinder closed at one end by a fitting 11 which is provided with threads as at 12 for threaded engagement with a holder (not shown). The fitting 11 may be secured to cylinder 10 as by welding at 9. Within cylinder 10 there are arranged two pistons 13 and 14. Piston 14 has formed integrally therewith a piston rod 15 having a reduced threaded end portion 16 which supports piston 13. Piston 13 is secured at the inner end of rod 15 by a nut 17 and a lock washer 18. The arrangement is such that pistons 13 and 14 are fixedly connected together in spaced relation for movement in unison.

Cylinder 10 is provided with an enlarged bore 19 at one end which terminates in a shoulder 20. Within the enlarged bore 19 there is arranged a sleeve member 21 which has a body portion 22 abutting against the shoulder 20 and an axially extending tubular portion 23. Body portion 22 has a central, axially extending bore 24 which slidably supports piston rod 15 so that the piston 13 is movable in the bore 25 of cylinder 10 and the piston 14 is movable in the bore 26 of sleeve member 21. The sleeve member 21 is retained in position abutting against shoulder 20 by a bushing 27 at the other end of cylinder 10. Bushing 27 is secured to cylinder 10 by suitable means, such as pins 28.

In addition to the piston rod 15, piston 14 has formed integrally therewith and on the face opposite rod 15 an extension 30. Extension 30 is formed with flat side faces as at 31 and bushing 27 is provided with a non-circular opening 32 which conforms in shape to the cross section of extension 30. At its extreme outer end, extension 30 is provided with a tapered shank 33 on which may be secured an electrode 34 as by means of a set screw 35.

Fitting 11 is fashioned with an axial inlet passage 36 which is enlarged as at 37 to accommodate the nut 17 at the inner end 16 of piston rod 15. Inlet passage 36 is threaded as at 38 for connection with a suitable conduit leading from a source of air under pressure. The welding head is preferably provided with a second inlet opening 39 which is radially disposed and which communicates with the enlargement 37. The body portion 22 of sleeve 21 is also provided with an inlet port 40 which is connected with an axially extending passage 41 which communicates with the chamber defined by piston 13 and body portion 22. Cylinder 10 is apertured as at 42 to permit a second air-supply conduit to be threadedly engaged in the port 40. Piston rod 15 is formed with an axial passage 43. Passage 43 is open at the end of the rod 15 which supports piston 13 so as to communicate with inlet passage 36 and port 39. At its inner end passage 43 intersects with a radial passage 44. Passage 44 is spaced axially inwardly of piston 14 and is disposed such that with the pistons in the retracted position, such as illustrated by solid lines in Fig. 2, the outer end of passage 44 is closed by the body portion 22 of sleeve 21.

Each of the pistons is provided with a circumferential groove 45 on the cylindrical surface thereof in which is seated an annular rubber seal 46. Sleeve 21 is sealed with respect to the bore 19 of cylinder 10 by an annular rubber seal 47 which is seated in a circumferential groove 48 around the outer surface of body 22. The body 22 is also sealed with respect to the rod 15 by an annular rubber seal 49 which is seated within a groove 50 formed in the bore 24.

To assemble the head, the rod 15 is first fitted through the bore 24 in the body portion 22 of sleeve 21 so that the piston 14 is disposed within the bore 26 of sleeve 21. Piston 13 is then secured to the end of rod 15 as by the nut 17 and lock washer 18. The entire assembly is then slipped into the cylinder 10 with the sleeve 21 engaging the bore 19. The sleeve is adjusted such that the port 40 is aligned with the opening 42 in the cylinder 10. Thereafter, the bushing 27 is slipped over the end of extension 30 so as to abut against the end of the tubular portion 23 of sleeve 21 and the entire assembly is locked in place by pins 28.

In operation an air-inlet line may be connected either with port 38 or with port 39 depending on the type of gun on which the head is used. If the inlet line is connected with port 39, then port 38 would be provided with a suitable plug. A second air-inlet line is connected with port 40. The air-supply lines leading to port 38 or 39, as the case may be, and port 40 are connected through a valve (not shown) which may be controlled by the trigger of the gun or by sequence controls of the welding machine for admitting air under pressure to one side of piston 13 on the work stroke through port 38 or 39 and to the other side of piston 13 on the return stroke through port 40. In the position indicated by full lines in Fig. 2, pistons 13 and 14 are in the retracted position. Air is directed through either port 38 or 39 into the enlargement 37 and into the axial passage 43 in rod 15. The pressure of the air admitted to enlargement 37 causes pistons 13 and 14 to move outwardly or to the right.

At the start of the outward movement of the pistons, the pressure acts against that face of piston 13 which is disposed toward the enlargement 37. As soon as the pistons have moved outwardly or to the right a distance such that the radial passage 44 clears the end face of body 22, air is directed through passage 43 and passage 44 to the space between body 22 and piston 14. Assuming that the air is supplied from a source of constant pressure, the total effective pressure with which the pistons are moved outwardly is substantially increased as soon as the radial passage 44 moves outwardly beyond the edge of body 22. Pistons 13 and 14 may move outwardly to the extreme position shown by dotted lines in Fig. 2 wherein piston 13 abuts against sleeve 21 and piston 14 abuts against bushing 27. When the trigger on the welding gun is released or actuated to reverse the application of pressure, the supply of air to port 38 or 39 is discontinued and the air is directed through port 42 and axial passage 41 to the opposite face of piston 13. This causes the pistons to move inwardly or towards the left. As piston 13 moves towards the left, the air in the chamber between piston 13 and fitting 11 is exhausted through port 38 or 39 and the air between piston 14 and body portion 22 of sleeve 21 is exhausted through radial passage 44, axial passage 43, to ports 38 or 39. However, after the pistons have moved inwardly an extent such that the radial passage 44 is closed by the body portion 22 of sleeve 21, the air between piston 14 and body portion 22 is trapped. This trapped air provides a cushion on the return stroke which prevents a full impact of the pistons against their associated stops, that is, fitting 11 and body portion 22. The air trapped between piston 14 and body 22 seeps around the rod 15 back into radial passage 44 and axial passage 41 so that the pistons return smoothly to their extreme inward position shown by full lines in Fig. 2.

It will be noted that on the work stroke the total effective piston area generally includes the face area of piston 13 and the area of piston 14 less the cross sectional area of piston rod 15. Thus the total effective piston area on the work stroke is substantially greater than the total cross sectional area of the cylinder. It will also be noted that the total volume of air required to return the pistons to their innermost position after a full work stroke is less than half the volume of air required for a full work stroke. This multiple piston arrangement is therefore conducive to efficient operation and makes for compactness in size.

The compactness in size is especially desirable in welding machines for producing a series of relatively closely spaced spot welds. A standard spacing of welds for a close spot-weld pattern is generally about two inches. I have found that with the welding head of my design the cylinder 10 can be formed with a diameter of 1⁶³⁄₆₄ inches and operated from a line pressure of 80 p. s. i. to meet the requirements of most any spot-welding operation. A series of welding heads of my design can therefore be mounted side by side on a multiple head machine to produce a two-inch spacing between welds, thus eliminating the necessity for using a source of power other than air on a machine requiring a close spot-weld pattern.

Another advantage of my design resides in the provision of the bushing 27 and the extension 30 of non-circular cross section on which the electrode 34 is secured. The non-circular cross section of extension 30 prevents rotation of the piston rod and therefore aids in maintaining the exact location of the working tip of the electrode 34. In addition, it will be noted that no seal contacts any surface that has been exposed to weld spatter. The fit between extension 30 and bushing 27 is preferably a close fit but not an air-tight fit. The bushing 27 prevents any weld spatter from accumulating in the bore 26 of sleeve 21 and also serves to wipe the surface of extension 30 so as to prevent foreign substances from reaching the working surface of piston 14.

Although the invention has been described in conjunction with a head for a welder, it will be appreciated that the invention is applicable to various types of fixtures, such as for clamping, etc.

I claim:

1. In combination, a cylinder having a bore, said bore having an enlarged portion extending to one end of the cylinder and connected with the other portion of the bore by an annular, inwardly offset shoulder, a sleeve in said enlarged bore having one end abutting said shoulder and forming a transverse wall in said cylinder which divides the cylinder into two compartments, said sleeve being shorter in length than said enlarged bore, a bushing in said enlarged bore abutting the other end of said sleeve, means securing said bushing on said cylinder, a piston in each of said chambers, and a rod extending through said partition wall and connecting said pistons together for movement in unison.

2. The combination set forth in claim 1 including inlet ports in one of said chambers on opposite sides of the piston therein, and inlet means in the other chamber on only that side of the piston therein which is disposed adjacent the piston in the first mentioned chamber.

3. The combination set forth in claim 1 wherein said piston within said sleeve is provided with an axial extension which projects outwardly of the cylinder through said bushing, said extension having means at the outer end thereof for supporting a work element.

FRANK FREDRICK FOLMER.

References Cited in the file of this patent

UNITED STATES PATENTS

| Number | Name | Date |
|---|---|---|
| 747,772 | Rickman | Dec. 22, 1903 |
| 2,055,815 | Dewey | Sept. 29, 1936 |
| 2,434,351 | Courtemanche | Jan. 13, 1948 |
| 2,460,196 | Simpson | Jan. 25, 1949 |
| 2,467,628 | O'Neill | Apr. 19, 1949 |
| 2,505,771 | Hoar et al. | May 2, 1950 |